(12) United States Patent
Yui

(10) Patent No.: US 11,084,227 B2
(45) Date of Patent: Aug. 10, 2021

(54) THERMO-FUSION ADDITIVE FABRICATION METHOD, PRODUCTION METHOD FOR THERMO-FUSION ADDITIVE FABRICATION OBJECT, AND STRUCTURE PARTIALLY INCLUDING THERMO-FUSION ADDITIVE FABRICATION OBJECT

(71) Applicant: MITSUBISHI HEAVY INDUSTRIES, LTD., Tokyo (JP)

(72) Inventor: Yuichi Yui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 83 days.

(21) Appl. No.: 16/368,789

(22) Filed: Mar. 28, 2019

(65) Prior Publication Data
US 2019/0299539 A1    Oct. 3, 2019

(30) Foreign Application Priority Data
Mar. 29, 2018   (JP) .............................. JP2018-063512

(51) Int. Cl.
*B29C 65/14*   (2006.01)
*B64F 5/10*   (2017.01)
(Continued)

(52) U.S. Cl.
CPC ...... *B29C 65/1416* (2013.01); *B29C 65/1477* (2013.01); *B29C 64/118* (2017.08);
(Continued)

(58) Field of Classification Search
CPC ............ B29C 65/1412; B29C 65/1416; B29C 65/1435; B29C 65/148; B29C 65/1483;
(Continued)

(56) References Cited

U.S. PATENT DOCUMENTS

2005/0000641 A1* 1/2005 Hartmann ........... B29C 66/9512
156/272.8
2014/0352886 A1* 12/2014 Choi .................... B29C 65/002
156/297

(Continued)

FOREIGN PATENT DOCUMENTS

JP         2015525150 A    9/2015
WO       2013180848 A1   12/2013

*Primary Examiner* — Daniel McNally
(74) *Attorney, Agent, or Firm* — Kanesaka Berner and Partners LLP

(57) ABSTRACT

A method for performing thermo-fusion additive fabrication so as to allow the fusion with a member shaped by an arbitrary method, a method allowing a thermo-fusion additive fabrication object to be surely fused with another member, and a structure at least partially including the thermo-fusion additive fabrication object are provided. A method for performing thermo-fusion additive fabrication such that fusion can be performed on a shaped member even afterward includes: a step of providing a near infrared ray absorption material on the member by the thermo-fusion additive fabrication, the near infrared ray absorption material containing a near infrared ray absorption agent that absorbs a near infrared ray and a resin in which the near infrared ray absorption agent is dispersed; and a step of providing a thermoplastic resin material on the near infrared ray absorption material by the thermo-fusion additive fabrication.

10 Claims, 5 Drawing Sheets

(51) Int. Cl.
 B29L 31/30 (2006.01)
 B33Y 10/00 (2015.01)
 B33Y 80/00 (2015.01)
 B29C 64/118 (2017.01)
(52) U.S. Cl.
 CPC ....... *B29L 2031/3076* (2013.01); *B33Y 10/00* (2014.12); *B33Y 80/00* (2014.12); *B64F 5/10* (2017.01)
(58) Field of Classification Search
 CPC ............ B29C 65/1616; B29C 65/1635; B29C 65/168; B29C 65/1683
 See application file for complete search history.

(56) References Cited

U.S. PATENT DOCUMENTS

| | | | |
|---|---|---|---|
| 2015/0024169 A1* | 1/2015 | Martin | G03G 15/1625 428/172 |
| 2016/0281267 A1* | 9/2016 | Wetzel | B29D 11/00721 |
| 2017/0144370 A1* | 5/2017 | Moore | B29C 64/141 |

\* cited by examiner

THERMO-FUSION ADDITIVE FABRICATION METHOD, PRODUCTION METHOD FOR THERMO-FUSION ADDITIVE FABRICATION OBJECT, AND STRUCTURE PARTIALLY INCLUDING THERMO-FUSION ADDITIVE FABRICATION OBJECT

RELATED APPLICATIONS

The present application claims priority of Japanese Application Number 2018-063512 filed Mar. 29, 2018, the disclosure of which is hereby incorporated by reference herein in its entirety.

BACKGROUND OF THE INVENTION

Field of the Invention

The present invention relates to a joining technology using fusion of a thermo-fusion additive fabrication object.

Description of the Related Art

Conventionally, additive manufacturing technologies including additive fabrication have been used mainly as an auxiliary tool in product development, as exemplified by trial production and a jig. However, in recent years, development for using an additive fabrication object shaped by the additive fabrication as a part of a product has been carried out.

Such a development has realized a thermo-fusion additive fabrication that uses a general thermo-fusion additive fabrication apparatus (a so-called 3D (three-dimensional) printer) and that uses a thermoplastic resin material having a high heatproof temperature, as exemplified by PEEK (polyether ether ketone) (for example, JP 2015-525150 A).

In the thermo-fusion additive fabrication, an additive fabrication object is obtained by repeating a process of disposing a melted resin material from a nozzle for each layer based on slice data showing shapes of layers of a fabrication target. The thermoplastic resins of the layers are fused with each other.

The thermo-fusion additive fabrication object obtained from the thermoplastic resin material having a high heatproof temperature is suitable as a member of an aircraft requiring heat resistance.

SUMMARY OF THE INVENTION

In the execution of a trial in which an additive fabrication object is shaped on a fiber-reinforced resin member obtained by press forming or the like and is fused with the fiber-reinforced resin member by the 3D printer using PEEK or the like, it is found that there is a problem in that the additive fabrication object and the fiber-reinforced resin member cannot be fused or the strength of the joining by fusion is low. This is because it is difficult to fuse the resin to be used with another member in a state where the resin is softened or melted in the thermo-fusion additive fabrication process with the 3D printer.

When the structure in which the additive fabrication object and another member are joined at a low joining strength by the additive fabrication process is put in an oven or the like and is heated so that the joining spot is fused, there is a possibility of the deformation of the structure or the decrease in property, because the whole structure is heated.

In view of the above, the inventor of the present invention has conceived the idea that a material in which a near infrared ray absorption agent is dispersed in a resin is applied to the thermo-fusion additive fabrication object. The technology using the material containing the near infrared ray absorption agent is known as the P-Wave™/PTIR™ method (U.S. registered trademark of Kubota Research Associates, Inc.).

The present invention has an object to provide a method for performing thermo-fusion additive fabrication so as to allow the fusion with a member shaped by an arbitrary method, a method allowing a thermo-fusion additive fabrication object to be sufficiently fused with another member, and a structure at least partially including the thermo-fusion additive fabrication object.

The present invention is a thermo-fusion additive fabrication method for performing thermo-fusion additive fabrication such that fusion can be performed on a shaped member even afterward, the thermo-fusion additive fabrication method including: a step of providing a near infrared ray absorption material on the member by the thermo-fusion additive fabrication, the near infrared ray absorption material containing a near infrared ray absorption agent that absorbs a near infrared ray and a thermoplastic matrix resin in which the near infrared ray absorption agent is dispersed; and a step of providing a thermoplastic resin material on the near infrared ray absorption material by the thermo-fusion additive fabrication.

In the present invention, the "near infrared ray" means an electromagnetic wave in a wavelength range of about 700 nm to about 2500 nm.

Further, the present invention is a method for producing a structure including a thermo-fusion additive fabrication object and a member that are joined to each other by fusion, the production method including: a step of fusing a thermo-fusion additive fabrication object obtained by the above-described thermo-fusion additive fabrication method and the member by irradiating a near infrared ray absorption part with the near infrared ray through a fabrication body part or the member, the near infrared ray absorption part being formed from the near infrared ray absorption material in the thermo-fusion additive fabrication object, the fabrication body part being formed from the thermoplastic resin material.

Furthermore, the present invention is a method for producing a structure including a thermo-fusion additive fabrication object and a member that are joined to each other by fusion, the production method including: a step of providing a near infrared ray absorption part on a fabrication body part by thermo-fusion additive fabrication using a near infrared ray absorption material, following a step of fabricating the fabrication body part by the thermo-fusion additive fabrication using the thermoplastic resin material, the near infrared ray absorption material containing a near infrared ray absorption agent that absorbs a near infrared ray and a thermoplastic matrix resin in which the near infrared ray absorption agent is dispersed; a step of disposing the member on a near infrared ray absorption part side of the thermo-fusion additive fabrication object including the fabrication body part and the near infrared ray absorption part; and a step of fusing the thermo-fusion additive fabrication object and the member by irradiating the near infrared ray absorption part with the near infrared ray through the fabrication body part or the member.

Moreover, the present invention is a method for producing a structure including a thermo-fusion additive fabrication object and a member that are joined to each other by fusion, the production method including: a step of providing a near infrared ray absorption part on one of the thermo-fusion additive fabrication object and the member, the near infrared ray absorption part containing a near infrared ray absorption agent that absorbs a near infrared ray and a thermoplastic matrix resin in which the near infrared ray absorption agent is dispersed; a step of fabricating the other of the thermo-fusion additive fabrication object and the member on the near infrared ray absorption part provided on the member that is the one, by thermo-fusion additive fabrication, or disposing the other on the near infrared ray absorption part provided on the one; and a step of fusing the thermo-fusion additive fabrication object and the member by irradiating the near infrared ray absorption part with the near infrared ray through the thermo-fusion additive fabrication object or the member.

The present invention is a method for producing a structure including a thermo-fusion additive fabrication object and a member that are joined to each other by fusion, the production method including: a step of disposing a near infrared ray absorption part between the thermo-fusion additive fabrication object and the member, the near infrared ray absorption part containing a near infrared ray absorption agent that absorbs a near infrared ray and a thermoplastic matrix resin in which the near infrared ray absorption agent is dispersed; and a step of fusing the thermo-fusion additive fabrication object and the member by irradiating the near infrared ray absorption part with the near infrared ray through the thermo-fusion additive fabrication object or the member.

In the production method for the structure in the present invention, it is possible to obtain a structure at least partially including an overhang shape as a whole of the thermo-fusion additive fabrication object and the member.

In the production method for the structure in the present invention, it is preferable that the structure be included in an aircraft.

In a structure in the present invention, a near infrared ray absorption agent exists between a thermo-fusion additive fabrication object and a member, the near infrared ray absorption agent absorbing a near infrared ray, the thermo-fusion additive fabrication object being shaped by thermo-fusion additive fabrication, the member being joined to the thermo-fusion additive fabrication object.

According to the present invention, even when the member and the thermo-fusion additive fabrication object cannot be fused or are not sufficiently fused in the process of the thermo-fusion additive fabrication, it is possible to obtain a structure in which the member and the thermo-fusion additive fabrication object are sufficiently joined by the fusion, by irradiating the near infrared ray absorption part existing at the joining spot between the member and the thermo-fusion additive fabrication object, with the near infrared ray.

DETAILED DESCRIPTION OF THE PREFERRED EMBODIMENTS

Hereinafter, embodiments of the present invention will be described with reference to the accompanying drawings.

The embodiments of the present invention disclose technologies each of which produces a structure at least partially including a thermo-fusion additive fabrication object by fusing a thermo-fusion additive fabrication object obtained by thermo-fusion additive fabrication with another member using a near infrared ray and a near infrared ray absorption material.

In the specification, the "fusion" means that a thermoplastic resin softened or melted by being heated to nearly the melting point or equal to or higher than the melting point comes into contact with another member and thereby is bonded to the other member.

The embodiments of the present invention realize the joining by the fusion between the thermo-fusion additive fabrication object fabricated on the other member by the thermo-fusion additive fabrication using a 3D printer or the like and the other member, even when the thermo-fusion additive fabrication object is not sufficiently fused with the other member depending on the additive fabrication process. For this purpose, a near infrared ray absorption material is disposed at the joining spot.

The embodiments of the present invention are suitable in the case where it is difficult to increase the temperature of the thermoplastic resin material to a temperature necessary for softening or melting the thermoplastic resin material (to nearly the melting point or equal to or higher than the melting point) in the thermo-fusion additive fabrication process, for example, in the case where the melting point of the thermoplastic resin material used in the thermo-fusion additive fabrication object to be fused with the other member is higher than those of general-purpose resin materials.

First Embodiment

Figure 1:
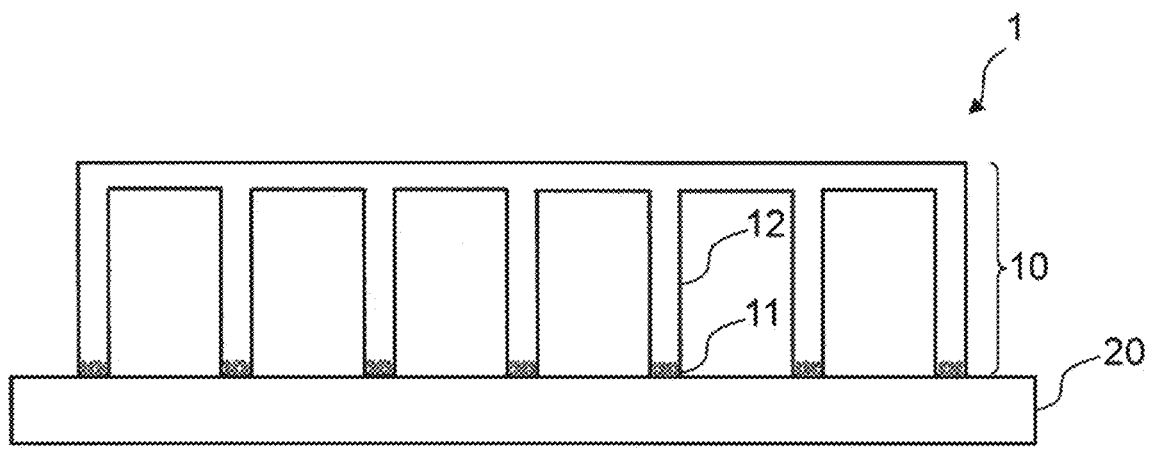
FIG. 1 is a diagram schematically showing a structure according to a first embodiment, the structure at least partially including a thermo-fusion additive fabrication object.

A structure 1 shown in FIG. 1 is configured to include a thermo-fusion additive fabrication object 10 (hereinafter, referred to as an additive fabrication object 10) and a member 20 that are joined to each other by fusion. The structure 1 is produced by a later-described method.

(Additive Fabrication Object)

The additive fabrication object 10 is shaped by thermo-fusion additive fabrication (FDM; Fused Deposition Modeling) using a thermoplastic resin material. The thermoplastic resin material may be an amorphous resin material, or may be a crystalline resin material. Examples thereof include polyethylene, polypropylene, polystyrene, polyamide, polyester, polyacrylate, polycarbonate, polyvinyl chloride, polyamide imide, polyimide, polyketone, polyether ether ketone, polyphenylene sulfide, polyphthalamide, polyether imide, polyphenylene sulfone, polysulfone, and polyether sulfone.

It is preferable that the thermoplastic resin material composing the additive fabrication object 10 have an appropriate heat resistance, in consideration of the use of the structure 1.

The index of the heat resistance may be continuous use temperature, heat-deformation temperature (load-deflection temperature), or the like.

Examples of resin materials having higher heat-deformation temperatures than general-purpose thermoplastic resin materials (for example, polyethylene and polypropylene) include polyamide imide, polyimide, polyketone, polyether ether ketone, polyphenylene sulfide, polyphthalamide, polyether imide, polyphenylene sulfone, polysulfone, and polyether sulfone. The materials described above have higher melting points than general-purpose thermoplastic resin material, which have melting points of about 95-165° C. Particularly, polyether ether ketone (PEEK), polyphenylene sulfide (PPS), polyphthalamide (PPA) and polyamide imide (PAI) have high melting points. The melting points of them are about 290-330° C.

(Member)

The member 20 can be shaped into an appropriate shape, by an arbitrary method. The member 20 in the embodiment is shaped into a plate shape by press forming, using a fiber-reinforced resin material containing a reinforcement fiber such as a glass fiber or a carbon fiber. In addition, the member 20 may be shaped by a method in which a prepreg and an autoclave are used, a VaRTM (Vacuum assisted Resin Transfer Molding) in which the impregnation with a liquid resin is performed under reduced pressure, or the like.

The member 20 may be formed from a thermoplastic resin material containing no reinforcement fiber.

Since the member 20 contains the thermoplastic resin material, it is possible to soften or melt both of the thermoplastic resin material composing the additive fabrication object 10 and the thermoplastic resin material of the member 20, at the joining spot, and therefore, a sufficient fusion is easily performed.

In the case where the structure 1 requires strength or rigidity, it is preferable to use, for example, a fiber-reinforced resin material in which the carbon fiber is impregnated with PEEK, in the member 20.

When the heat resistances of the thermoplastic resin materials respectively used in the member 20 and the additive fabrication object 10 are high, it is possible to obtain heat resistance as the whole of the structure 1. The structure 1 is appropriate as a member that is included in an aircraft that requires a high heat resistance because of the use in a harsh environment, and other transport planes and apparatuses that require heat resistance.

The additive fabrication object 10 is fused with the member 20 using the near infrared ray and the near infrared ray absorption material, and therefore, the near infrared ray absorption material is provided in the member 20. In the embodiment, using the above-described thermoplastic resin material and the near infrared ray absorption material, the thermo-fusion additive fabrication is performed such that fusion can be performed on the member 20 even afterward. A near infrared ray absorption part 11 formed from the near infrared ray absorption material provided on the member 20 constitutes a part of the additive fabrication object 10.

Even when the fusion of the thermoplastic resin material with the member 20 is insufficient in the process of the thermo-fusion additive fabrication, it is possible to sufficiently perform the fusion by the softening or melting of at least a joining part of the additive fabrication object 10, by irradiating the near infrared ray absorption part 11 with the near infrared ray and heating the joining spot between the additive fabrication object 10 and the member 20 from the near infrared ray absorption part 11, after the thermo-fusion additive fabrication.

(Near Infrared Ray Absorption Material)

The near infrared ray absorption material is configured to contain a near infrared ray absorption agent that absorbs the near infrared ray and an appropriate thermoplastic matrix resin in which the near infrared ray absorption agent is dispersed. In the near infrared ray absorption material, the absorption coefficient in the wavelength range of near infrared rays is comparable to or higher than that in the other wavelength range. In general resin materials as high-molecular compounds, which includes the thermoplastic resin material, the absorption coefficient in the wavelength range of near infrared rays is low, and therefore, general resin materials transmit almost all near infrared rays. However, the absorption coefficients in the wavelength ranges of middle infrared rays and far infrared rays are high. Accordingly, when the near infrared ray absorption material is provided in the member 20 and a fabrication body part 12 formed from the thermoplastic resin material is irradiated with the near infrared ray after the thermo-fusion additive fabrication in which the thermoplastic resin material is laminated, almost all of the near infrared ray passes through the fabrication body part 12 and enters the near infrared ray absorption part 11. The near infrared ray is hardly absorbed by the fabrication body part 12, and therefore, the thermal influence on the fabrication body part 12 is small.

As the near infrared ray absorption agent, for example, fine particles composed of carbon black, graphite, charcoal, talc, glass filler, ceramic, metal oxide, a phthalocyanine pigment, another organic pigment or inorganic pigment or the like and having a nm-order particle diameter can be used as disclosed in the specification of U.S. Patent Publication No. 2006/283543. In addition, as the near infrared ray absorption agent, metal powders composed of stainless steel, brass, aluminum, copper or the like may be used.

The near infrared ray absorption agent in the embodiment is composed of one or more kinds of particles or powders selected from the above, and the absorption coefficient in a wavelength range of 700 nm to 2000 nm for near infrared rays is comparable to or higher than that in the other wavelength range. The wavelength range in which the absorption coefficient of the near infrared ray absorption agent is high only needs to be 800 nm to 1650 nm, in which almost all kinds of polymeric materials transmit.

"PTIR™" that is provided by Kubota Research Associates, Inc. in U.S. is suitable as the near infrared ray absorption material in the embodiment containing the near infrared ray absorption agent and the matrix resin in which the near infrared ray absorption agent is dispersed.

The near infrared ray absorption material containing the near infrared ray absorption agent and the matrix resin in which the near infrared ray absorption agent is dispersed constitutes a part of the structure 1, similarly to the thermoplastic resin material composing the fabrication body part 12. The thermoplastic matrix resin to be used in the near infrared ray absorption material may be the same as or different from the thermoplastic resin material forming the fabrication body part 12.

In the case where the structure 1 requires heat resistance, the near infrared ray absorption material needs to have a heat resistance equivalent to the heat resistance of the thermoplastic resin material of the fabrication body part 12. In this case, the same resins as the resins that can be used as the thermoplastic resin material of the fabrication body part 12 can be used as the matrix resin of the near infrared ray absorption material.

The near infrared ray absorption agent is heated by absorbing the near infrared ray, so that the resin material absorbs the middle infrared ray and far infrared ray emitted from the near infrared absorption agent. Thereby, the joining spot between the member 20 and the additive fabrication object 10 can be heated. The near infrared ray absorption agent converts the entering near infrared ray into a far infrared ray having a longer wavelength, and releases the far infrared ray. The near infrared ray absorption agent functions as a far infrared ray emitter.

By the radiation of the middle infrared ray and far infrared ray emitted from the near infrared absorption agent, only the joining spot between the member 20 and the additive fabrication object 10 and the vicinity are locally heated.

A minute amount of near infrared ray absorption agent only needs to be contained in the near infrared ray absorption material. For example, in the case where the thickness of the near infrared ray absorption part 11 provided in the member 20 is 0.2 mm, the near infrared ray absorption agent only needs to be contained at about 0.05 wt %. The ratio of the near infrared ray absorption agent can be appropriately set depending on the thickness of the near infrared ray absorption part 11 and the like. It is preferable that the near infrared ray absorption agent be uniformly dispersed in the resin over the whole of the thickness of the near infrared ray absorption part 11.

The thickness of the near infrared ray absorption part 11, without being particularly limited, can be appropriately set depending on the diameter of a nozzle included in a thermo-fusion additive fabrication apparatus and the like. The thickness of the near infrared ray absorption part 11 can be set, for example, to about 0.05 mm to 20 mm.

(Production Method for Structure)

Next, a method for producing the structure 1 will be described. As shown in FIG. 2A to FIG. 2D, the production method for the structure 1 includes step S1 (S11, S12) of the thermo-fusion additive fabrication for shaping the additive fabrication object 10 and step S2 of irradiating the additive fabrication object 10 with the near infrared ray.

In step S1 of the thermo-fusion additive fabrication, a known thermo-fusion additive fabrication apparatus (not illustrated) such as a 3D printer can be used.

The thermo-fusion additive fabrication apparatus laminates a melted resin material from a nozzle for each layer, based on slice data showing shapes of layers that are obtained from data about a three-dimensional shape of the targeted additive fabrication object 10. The thickness of one layer is 100 m, for example.

For example, the thermo-fusion additive fabrication apparatus includes a heater, a spool, a pulley and a fabrication head. The heater melts a resin material. The spool stores the melted resin. The pulley feeds the melted resin. The fabrication head includes a nozzle to discharge the melted resin fed from the pulley, to a fabrication table or a necessary spot on a laminated body during fabrication.

For the thermo-fusion additive fabrication in the embodiment, the above-described thermoplastic resin material and the near infrared ray absorption material are used. The above-described "PTIR™" is suitable as the near infrared ray absorption material. The thermo-fusion additive fabrication apparatus may include nozzles that respectively correspond to the materials and a mechanism that feeds the materials to the nozzles, or may be configured to switch the material to be fed to an identical nozzle.

In step S2 of the irradiation with the near infrared ray, it is possible to use a near infrared ray irradiation apparatus 3 (illustrated in FIG. 2D) including a lamp and a filter. The lamp radiates lights in a wavelength range including the near infrared ray. The filter selectively transmits only the near infrared ray from the lights emitted by the lamp.

It is preferable that the power density of the near infrared ray with which the irradiation is performed by the near infrared ray irradiation apparatus 3 be 3000 W/mm² or higher, for example.

The additive fabrication object 10 is irradiated with the near infrared ray transmitted by the filter of the near infrared ray irradiation apparatus 3. As the wavelength of the near infrared ray transmitted by the filter, it is preferable to select a wavelength range in which the absorption coefficient of the above-described near infrared ray absorption agent is high.

The near infrared ray irradiation apparatus 3 may be incorporated in the thermo-fusion additive fabrication apparatus.

A product family of "P-Wave™" that is provided by Kubota Research Associates, Inc. in U.S. is suitable as the near infrared ray irradiation apparatus 3 in the embodiment.

A specific example of the production method for the structure 1 according to the first embodiment will be described with reference to FIG. 2A to FIG. 2D. A characteristic of the production method in the first embodiment is that the near infrared ray absorption material is provided on the member 20 by the thermo-fusion additive fabrication.

Figure 2A:
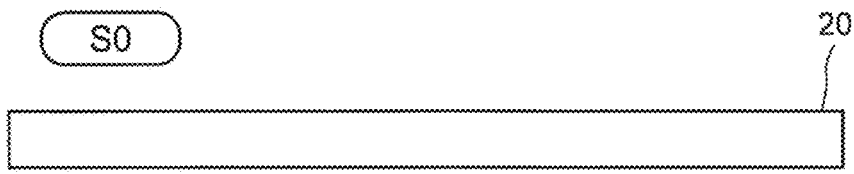
FIG. 2A to FIG. 2D are diagrams for describing a procedure of production of the structure shown in FIG. 1.

FIG. 2A shows the member 20 on which the thermo-fusion additive fabrication is performed. For performing the thermo-fusion additive fabrication (FIG. 2B and FIG. 2C), the member 20 already shaped by an arbitrary method is prepared as shown in FIG. 2A (step S0).

Figure 2B:
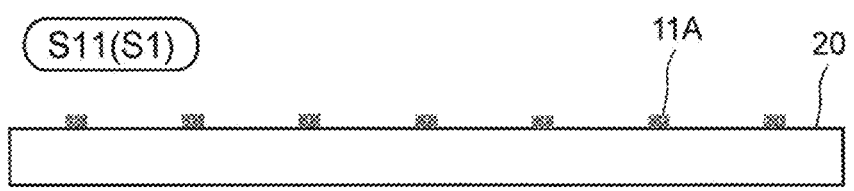

Next, as shown in FIG. 2B, a melted near infrared ray absorption material 11A is provided on a surface of the member 20 from an unillustrated nozzle, using an unillustrated thermo-fusion additive fabrication apparatus such as a 3D printer (step S11). The thermo-fusion additive fabrication apparatus laminates the near infrared ray absorption material 11A on the member 20 to the number of layers corresponding to the thickness set for the near infrared ray absorption part 11, based on the slice data for the targeted additive fabrication object 10.

The matrix resin of the near infrared ray absorption material 11A after the discharge from the nozzle fuses with the melted matrix resin of the near infrared ray absorption material discharged so as to be lapped thereon, and cures under an ordinary-temperature atmosphere. While the lamination is being continuously performed without being stopped, the temperature of the resin discharged from the nozzle does not decrease very much, and on the resin in the softened or melted state, the next resin is laminated, so that the resins fuse between the layers.

Meanwhile, in some cases, the member 20 and the near infrared ray absorption material 11A are not sufficiently fused. This is because it is difficult to maintain, until the fusion, a temperature necessary for the fusion while the near infrared ray absorption material 11A laminated on the member 20 having the ordinary temperature is softened or melted. Although it is possible to warm the member 20 using a heater mat or the like, it is sometime difficult to warm the member 20 for avoiding the thermal degradation of the member 20. In the embodiment, the member 20 and the near infrared ray absorption part 11 are fused in the near infrared ray irradiation step S2 that is performed after the thermo-fusion additive fabrication step S1.

Figure 2C:
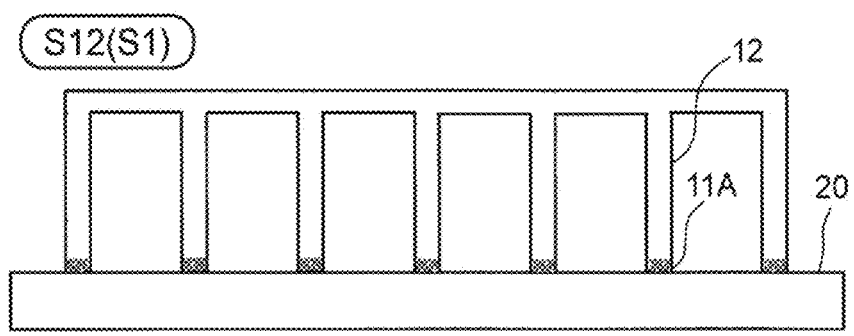

Following step S11 in which the near infrared ray absorption material 11A is provided on the member 20, as shown in FIG. 2C, the melted thermoplastic resin material 12A is provided on the near infrared ray absorption material 11A from the nozzle, using the same thermo-fusion additive fabrication apparatus (step S12). The lamination of the thermoplastic resin material is repeated based on the slice data, and thereby, the fabrication body part 12 is obtained.

In the example shown in FIG. 2A to FIG. 2D, a shape in which poles or walls stand from the member 20 is fabricated by laminating the thermoplastic resin material on the same two-dimensional positions as the near infrared ray absorption material 11A, but a more complex shape can be fabricated.

Immediately after step S11, step S12 of providing the thermoplastic resin material 12A is performed, and thereby, the melted thermoplastic resin material 12A fuses with the near infrared ray absorption material 11A. Thereby, the additive fabrication object 10 including the near infrared ray absorption part 11 formed from the near infrared ray absorption material 11A and the fabrication body part 12 formed from the thermoplastic resin material is integrally obtained.

At the time when step S1 of the thermo-fusion additive fabrication configured by the above-described steps S11 and S12 finishes, the additive fabrication object 10 is not sufficiently fused with the member 20.

Figure 2D:
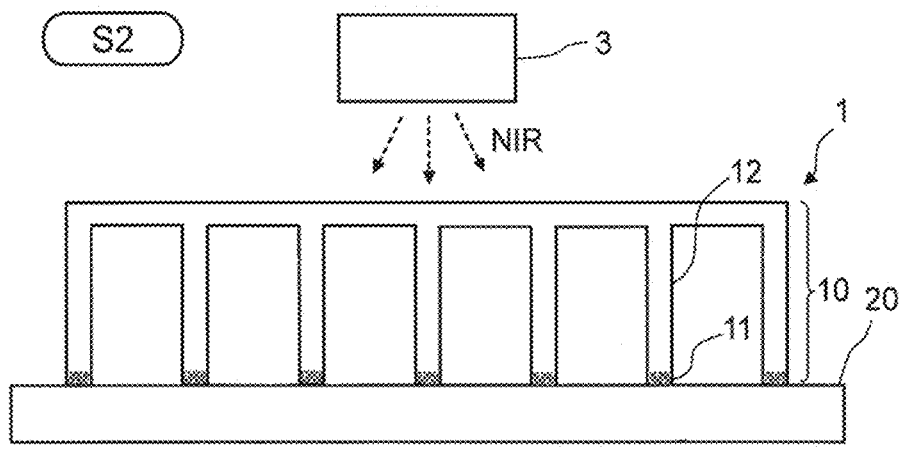

Hence, as shown in FIG. 2D, the near infrared ray absorption part 11 is irradiated with the near infrared ray through the fabrication body part 12, using the near infrared ray irradiation apparatus 3, and thereby, the additive fabrication object 10 and the member 20 are fused. At this time, for example, the additive fabrication object 10 may be pressed against the member 20, and thereby, the additive fabrication object 10 and the member 20 may be fused in a pressurization state.

If the member 20 and the additive fabrication object 10 are not fused and are in a separated state at the time when the thermo-fusion additive fabrication finishes, the positioning of the additive fabrication object 10, as necessary, may be performed with respect to the member 20, at the time of the irradiation with the near infrared ray.

As shown in FIG. 2D, the near infrared ray absorption part 11 is irradiated with the near infrared ray through the fabrication body part 12. However, in the case where the member 20 is formed from a material that transmits the near infrared ray, the near infrared ray absorption part 11 may be irradiated with the near infrared ray through the member 20 from the back side (the lower side in FIG. 2D) of the member 20. Alternatively, the near infrared ray irradiation apparatus 3 may be disposed on both of the upper side and lower side of the near infrared ray absorption part 11, and the near infrared ray absorption part 11 may be irradiated with the near infrared ray through both of the fabrication body part 12 and the member 20.

When the near infrared ray is absorbed by the near infrared ray absorption agent of the near infrared ray absorption part 11, the matrix resin of the near infrared ray absorption part 11 is heated to a temperature necessary for the fusion, by the middle infrared ray and far infrared ray emitted from the near infrared ray absorption agent, and therefore, the near infrared ray absorption part 11 is sufficiently fused with the member 20. The thermoplastic resin contained in the member 20 and the thermoplastic resin of the near infrared ray absorption part 11 both melt and fuse.

At this time, the fabrication body part 12 near the interface between the fabrication body part 12 and the near infrared ray absorption part 11 may or may not be softened or melted, by the radiation of the middle infrared ray and the far infrared ray from the near infrared ray absorption part 11. This is because the fabrication body part 12 and the near infrared ray absorption part 11 have been already fused in the process of the thermo-fusion additive fabrication in the embodiment.

The middle infrared ray and far infrared ray emitted from the near infrared ray absorption agent locally heats only a spot necessary for the joining between the member 20 and the additive fabrication object 10, through the resin in which the near infrared ray absorption agent is dispersed. Accordingly, unlike the case of heating the member 20 and the additive fabrication object 10 within an oven or the like, it is possible to obtain the structure 1 in which the member 20 and the additive fabrication object 10 are sufficiently joined, while avoiding the thermal influence such as the deformation or property change due to heat from reaching the whole of the structure 1.

According to the above production method, even when the member 20 and the additive fabrication object 10 fabricated on the member 20 cannot be fused or are not sufficiently fused in the process of the thermo-fusion additive fabrication, it is possible to obtain the structure 1 in which the member 20 and the additive fabrication object 10 fabricated on the member 20 are sufficiently joined by the fusion, by irradiating the near infrared ray absorption part 11 provided at the joining spot between the member 20 and the additive fabrication object 10 with the near infrared ray.

[Modification of First Embodiment]

The near infrared ray absorption part 11 does not always need to be provided on the member 20 by the thermo-fusion additive fabrication. For example, the near infrared ray absorption part 11 can be shaped into a film form, from the near infrared ray absorption material containing the near infrared ray absorption agent and the matrix resin. Even when the near infrared ray absorption materials 11A are scattered as shown in FIG. 2B, they can be connected and shaped into a form of a single film. This film-shaped near infrared ray absorption part 11 can be provided on the member 20, by pasting or the like. The film-shaped near infrared ray absorption part 11 may be merely disposed on the member 20. On the film-shaped near infrared ray absorption part 11, as shown in FIG. 2C, the thermoplastic resin material 12A can be laminated by the thermo-fusion additive fabrication.

Even when the film-shaped near infrared ray absorption part 11 and the fabrication body part 12 formed from the thermoplastic resin material 12A laminated thereon are not sufficiently fused, the fabrication body part 12 formed from the thermoplastic resin material and the matrix resin of the near infrared ray absorption part 11 both are softened or melted and are fused with each other, by the middle infrared ray and far infrared ray emitted from the near infrared ray absorption agent due to the irradiation of the near infrared ray absorption part 11 with the near infrared ray. Together with the member 20 with which the matrix resin of the near infrared ray absorption part 11 is fused, the fabrication body part 12, the near infrared ray absorption part 11 and the member 20 are integrated by the fusion.

An example in which the thermo-fusion additive fabrication is performed on a member 25 different in shape from the above-described member 20 having a flat-plate shape will be described with reference to FIG. 3A to FIG. 3D. The member 25 includes a first region 251 and a second region 252. In the first region 251, the size in the thickness direction is relatively small. In the second region 252, the size in the thickness direction is relatively large. A back surface 25A of the member 25 is formed in a planar shape over the whole of the first region 251 and the second region 252.

When the heights from the back surface 25A to the surfaces (fabrication surfaces) of the first and second regions 251, 252 are different as in the case of the member 25, an additive fabrication object 15 including the near infrared ray absorption part 11 and the fabrication body part 12 can be fabricated on the member 25, based on the slice data, using the thermo-fusion additive fabrication apparatus, for example, in accordance with a procedure shown in FIG. 3A to FIG. 3D.

Figure 3A:
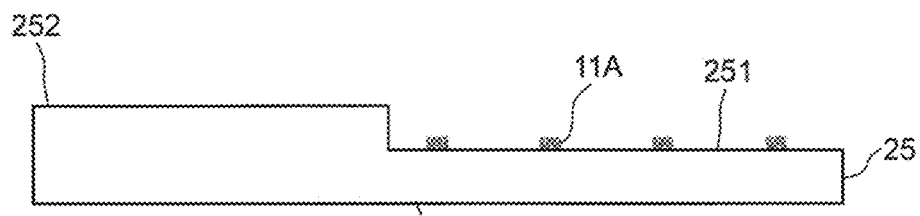
FIG. 3A to FIG. 3D are diagrams for describing a procedure of production of a structure according to a modification of the first embodiment.
Figure 3B:
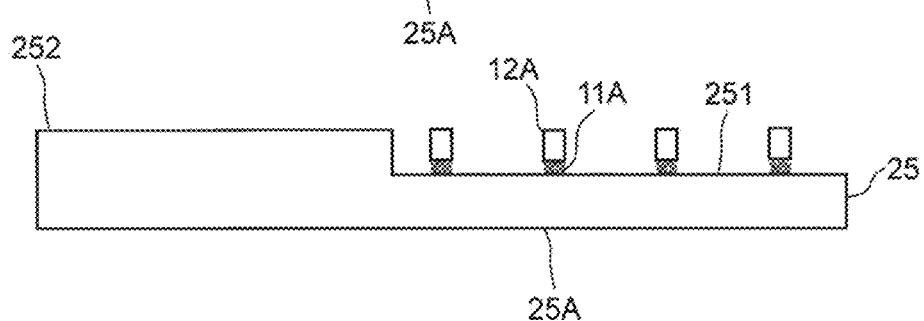
Figure 3C:
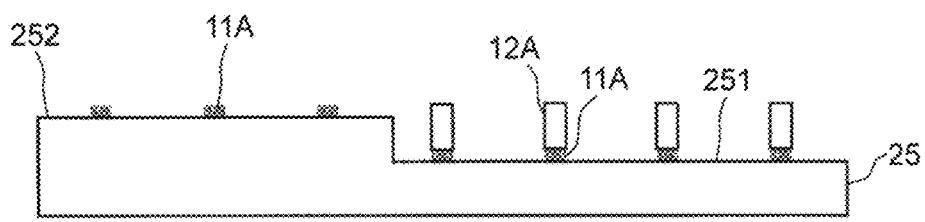

Specifically, as shown in FIG. 3A, the near infrared ray absorption material 11A is provided on the surface of the first region 251 in which the height from the back surface 25A is small, and as shown in FIG. 3B, the thermoplastic resin material 12A is laminated on the near infrared ray absorption material 11A provided on the first region 251. When the height of the laminated body constituted by the near infrared ray absorption material 11A and thermoplastic resin material 12A fabricated in the first region 251 reaches the height of the surface of the second region 252, the near infrared ray absorption material 11A is provided on the surface of the second region 252, and the thermoplastic resin material 12A is laminated on the laminated body in the first region 251, as shown in FIG. 3C.

Figure 3D:
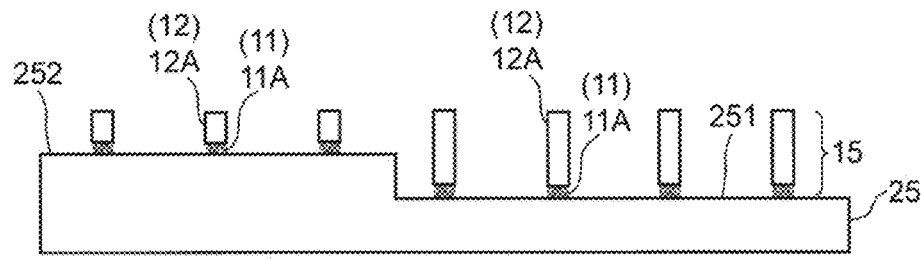

Thereafter, as shown in FIG. 3D, the thermoplastic resin material 12A is laminated to a predetermined height on the near infrared ray absorption material 11A provided in the second region 252, and therewith, the thermoplastic resin material 12A is laminated to a preset height in the first region 251.

After the additive fabrication object 15 having a targeted shape is obtained in this way, the near infrared ray absorption part 11 is irradiated with the near infrared ray, through the fabrication body part 12 formed from the thermoplastic resin material 12A or the member 25, using the near infrared ray irradiation apparatus 3 (FIG. 2D). As a result, the additive fabrication object 15 and the member 25 are fused by the middle infrared ray and far infrared ray emitted from the near infrared ray absorption agent contained in the near infrared ray absorption part 11.

Second Embodiment

Figure 4A:
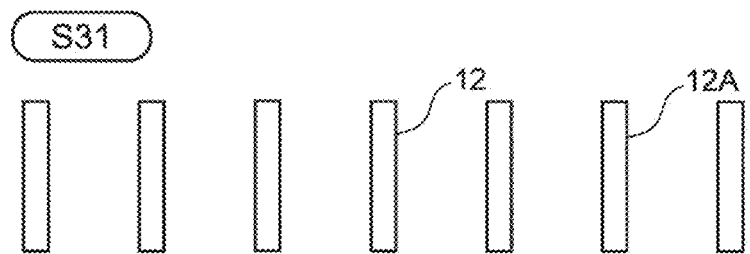
FIG. 4A to FIG. 4D are diagrams for describing a procedure of production of a structure according to a second embodiment.
Figure 4B:
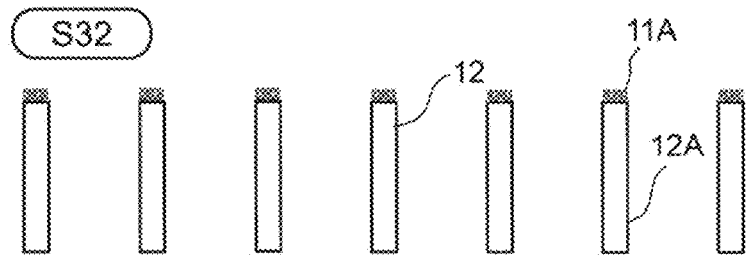

In an example shown in FIG. 4A to FIG. 4D, unlike the procedures shown in FIG. 2A to FIG. 2D and FIG. 3A to FIG. 3D, following step S31 of fabricating the fabrication body part 12 by the thermo-fusion additive fabrication using the thermoplastic resin material 12A as shown in FIG. 4A, step S32 of providing the near infrared ray absorption part 11 on the fabrication body part 12 by the thermo-fusion additive fabrication using the near infrared ray absorption material 11A as shown in FIG. 4B is performed.

Figure 4C:
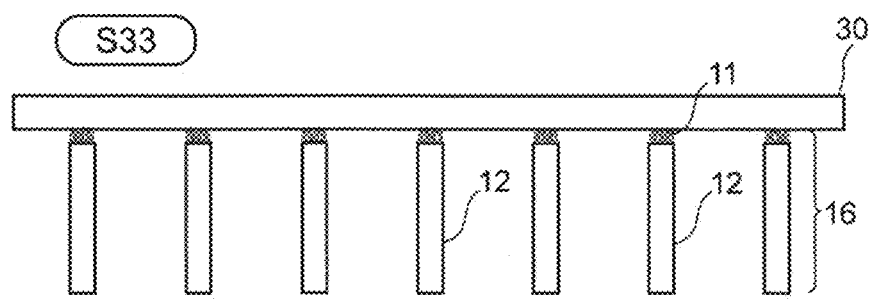
Figure 4D:
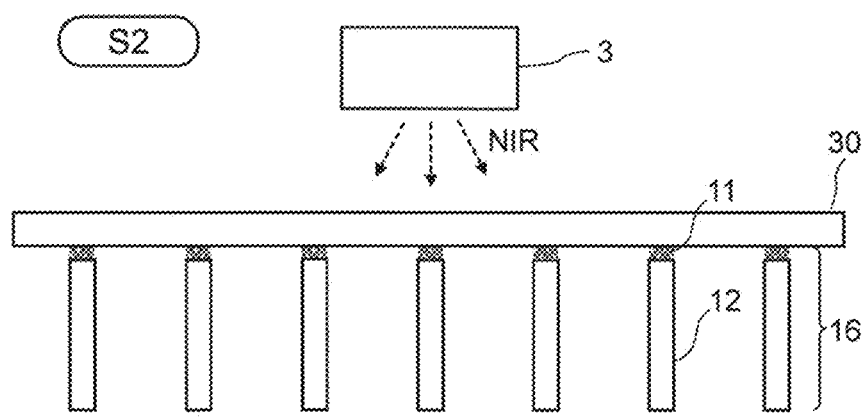

Thereafter, as shown in FIG. 4C, a member 30 is disposed on the near infrared ray absorption part 11 side of an additive fabrication object 16 constituted by the fabrication body part 12 and the near infrared ray absorption part 11 (step S33), and as shown in FIG. 4D, the near infrared ray absorption part 11 is irradiated with the near infrared ray through the fabrication body part 12 or the member 30 (step S2). In this example, the near infrared ray absorption part 11 is irradiated with the near infrared ray, through the member 30 formed from the thermoplastic resin material. As a result, the near infrared ray absorption part 11 and the member 30, in each of which the thermoplastic resin material is used, are softened or melted and are fused with each other, by the action of the near infrared ray absorption part 11.

[Modification of Second Embodiment]

In the second embodiment, the near infrared ray absorption part 11 (FIG. 4C) to be fused with the member 30 does not always need to be fabricated by the thermo-fusion additive fabrication. For example, the near infrared ray absorption part 11 can be shaped into a film form, from the near infrared ray absorption material. In a state where the film-shaped near infrared ray absorption part 11 is provided on the fabrication body part 12 or the member 30 or a state where the film-shaped near infrared ray absorption part 11 is sandwiched between the fabrication body part 12 and the member 30, the near infrared ray absorption part 11 is irradiated with the near infrared ray, and thereby, both of the fabrication body part 12 and the matrix resin of the near infrared ray absorption part 11 both are softened or melted. Therefore, together with the member 30 with which the matrix resin is fused, the fabrication body part 12, the near infrared ray absorption part 11 and the member 30 are integrated by the fusion.

Third Embodiment

Figure 5A:
FIG. 5A to FIG. 5C are diagrams for describing a procedure of production of a structure according to a third embodiment.

Next, a method for producing a structure 4 (FIG. 5C) at least partially including an overhang shape will be described with reference to FIG. 5A to FIG. 5C.

Figure 5B:
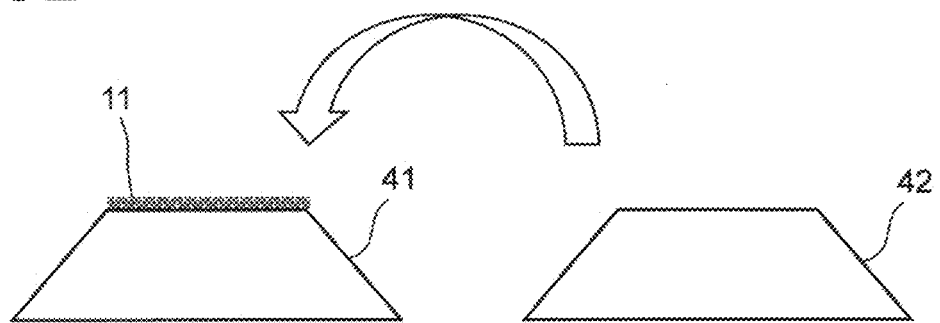
Figure 5C:
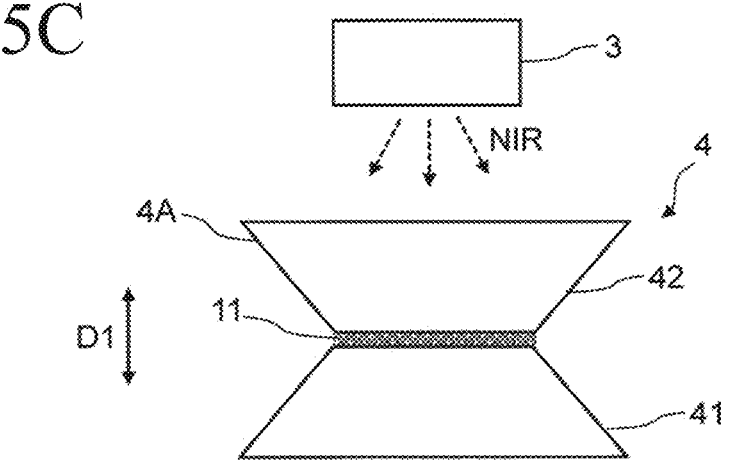

For example, the overhang shape means a shape in which an upper layer overhangs a lower layer when the structure 4 is projected in a direction (D1) in which the layers are laminated in the additive fabrication object as shown in FIG. 5C. When the inclination angle of an overhang part 4A with respect to the lamination direction D1 (vertical direction) is exceeding a certain inclination angle, the overhang part 4A is deformed by the self-weight, and therefore, it is not possible to shape the structure 4 including the overhang part 4A by the additive fabrication.

Hence, the structure 4 is divided into a plurality of parts to be shaped, and the respective shaped parts are fused and joined. In this example, as shown in FIG. 5A, the structure 4 is divided into a first additive fabrication object 41 as a lower half part and a second additive fabrication object 42 as an upper half part, and each of them is shaped by the thermo-fusion additive fabrication. The second additive fabrication object 42, which includes the overhang part 4A when the structure 4 is assembled as shown in FIG. 5C, is shaped at the time of the shaping shown in FIG. 5A, in a state where it is disposed in a direction vertically opposite to the direction at the time of the assembly.

As shown in FIG. 5B, the near infrared ray absorption part 11 is interposed between the first additive fabrication object 41 and second additive fabrication object 42 that are individually shaped, and as shown in FIG. 5C, the irradiation with the near infrared ray is performed, so that the first additive fabrication object 41 and the second additive fabrication object 42 can be fused by the middle infrared ray and far infrared ray released from the near infrared ray absorption agent that absorbs the near infrared ray.

The above-described technique is not limited to the overhang shape, and can be applied to a shape for which an integral shaping is difficult.

One or both of the first additive fabrication object 41 and the second additive fabrication object 42 may be shaped by a method other than the thermo-fusion additive fabrication.

In addition to the above, without departing from the spirit of the present invention, configurations described in the above embodiments can be selectively adopted, and can be appropriately modified to other configurations.

What is claimed is:

1. A production method of producing a structure at least partially including a thermo-fusion additive fabrication object, the production method being a method of producing a structure including the thermo-fusion additive fabrication object and a member that are joined to each other by fusion, the production method comprising:
a step of performing a first thermo-fusion additive fabrication to provide a near infrared ray absorption part on the member, wherein
a near infrared ray absorption material is laminated in a plurality of layers on the member to form the near infrared ray absorption part, the near infrared ray absorption material containing a near infrared ray absorption agent absorbing a near infrared ray and a thermoplastic matrix resin in which the near infrared ray absorption agent is dispersed, and
in the first thermo-fusion additive fabrication, the thermoplastic matrix resin of the near infrared ray absorption material in a melted state is applied to laminate the near infrared ray absorption material on the member;
a step of performing a second thermo-fusion additive fabrication to provide a fabrication body part to the member at the near infrared ray absorption part, wherein
the fabrication body part is formed from a thermoplastic resin material, and
the fabrication body part and the near infrared ray absorption part form the thermo-fusion additive fabrication object, and
after the step of performing the second thermo-fusion additive fabrication, a step of irradiating the near infrared ray absorption part with the near infrared ray through the fabrication body part or the member to fuse the thermo-fusion additive fabrication object and the member to form the structure.

2. The production method of producing the structure at least partially including the thermo-fusion additive fabrication object according to claim 1, wherein
the structure is included in an aircraft.

3. The production method according to claim 1, wherein the near infrared ray has a wavelength range between 700 nm and 2500 nm.

4. The production method according to claim 1, wherein the near infrared ray absorption agent of the near infrared ray absorption material includes metal powders composed of stainless steel, brass, aluminum, or copper.

5. The production method according to claim 1, wherein the thermoplastic matrix resin of the near infrared ray absorption material includes a material same as that of the thermoplastic resin material.

6. A production method of producing a structure at least partially including a thermo-fusion additive fabrication object, the production method being a method of producing a structure including the thermo-fusion additive fabrication object and a member that are joined to each other by fusion, the production method comprising:
a step of performing a second thermo-fusion additive fabrication to provide a near infrared ray absorption part on a fabrication body part using a near infrared ray absorption material, following a step of fabricating the fabrication body part by a first thermo-fusion additive fabrication using a thermoplastic resin material, the near infrared ray absorption material containing a near infrared ray absorption agent that absorbs a near infrared ray and a thermoplastic matrix resin in which the near infrared ray absorption agent is dispersed, wherein
the near infrared ray absorption material is laminated in a plurality of layers on the fabrication body part to form the near infrared ray absorption part, and
in the second thermo-fusion additive fabrication, the thermoplastic matrix resin of the near infrared ray absorption material in a melted state is applied to laminate the near infrared ray absorption material on the fabrication body part;
a step of disposing the member on a near infrared ray absorption part side of the thermo-fusion additive fabrication object including the fabrication body part and the near infrared ray absorption part; and
a step of irradiating the near infrared ray absorption part with the near infrared ray through the fabrication body part or the member to fuse the thermo-fusion additive fabrication object and the member.

7. The production method of producing the structure at least partially including the thermo-fusion additive fabrication object according to claim 6, wherein
the structure is included in an aircraft.

8. A production method of producing a structure at least partially including a thermo-fusion additive fabrication object, the production method being a method of producing a structure including the thermo-fusion additive fabrication object and a member that are joined to each other by fusion, the production method comprising:
a step of providing a near infrared ray absorption part on one of the thermo-fusion additive fabrication object and the member, the near infrared ray absorption part formed from a near infrared ray absorption material containing a near infrared ray absorption agent that absorbs a near infrared ray and a thermoplastic matrix resin in which the near infrared ray absorption agent is dispersed, wherein
the near infrared ray absorption material is laminated in a plurality of layers on the one of the thermo-fusion additive fabrication object and the member to form the near infrared ray absorption part, and
in providing the near infrared ray absorption part, the thermoplastic matrix resin of the near infrared ray absorption material in a melted state is applied to laminate the near infrared ray absorption material on the one of the thermo-fusion additive fabrication object and the member;
a step of performing a thermo-fusion additive fabrication to fabricate the other of the thermo-fusion additive fabrication object and the member on the near infrared ray absorption part provided on the one of the thermo-fusion additive fabrication object and the member; and
after the step of performing the thermo-fusion additive fabrication, a step of irradiating the near infrared ray absorption part with the near infrared ray through the thermo-fusion additive fabrication object or the member to fuse the thermo-fusion additive fabrication object and the member.

9. The production method of producing the structure at least partially including the thermo-fusion additive fabrication object according to claim 8, wherein
the production method is a method for obtaining a structure at least partially including an overhang shape as a whole of the thermo-fusion additive fabrication object and the member.

10. The production method of producing the structure at least partially including the thermo-fusion additive fabrication object according to claim 8, wherein
the structure is included in an aircraft.

* * * * *